Feb. 11, 1969
J. R. WESEL ET AL
3,427,010
HEATING APPARATUS AND PROCESS
Filed Oct. 19, 1965
Sheet 1 of 4
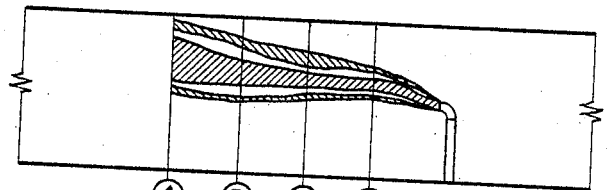
Fig. 1A.
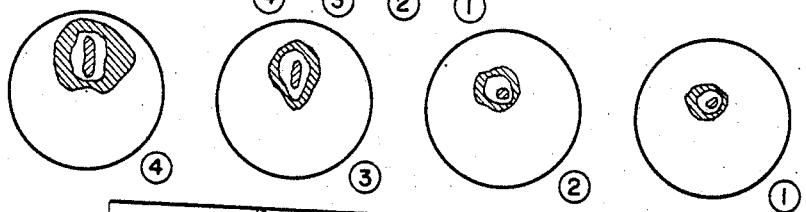
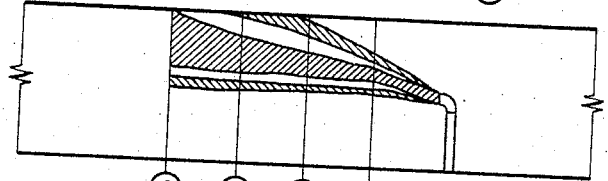
Fig. 1B.
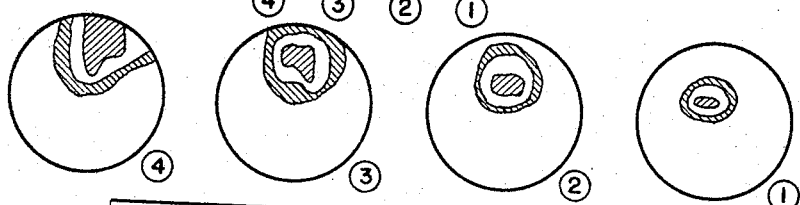
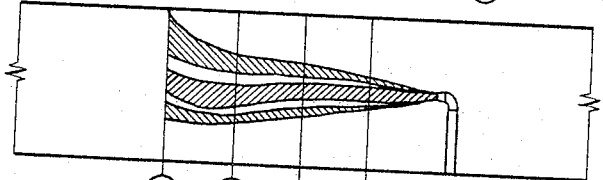
Fig. 2A.
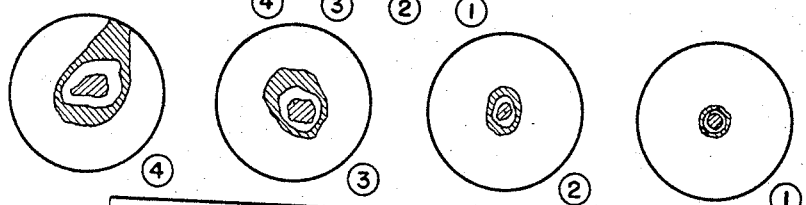
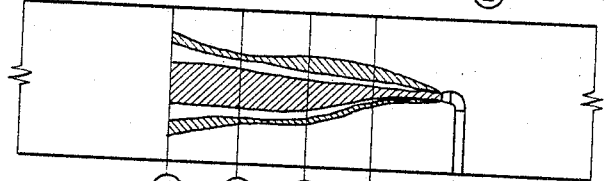
Fig. 2B.
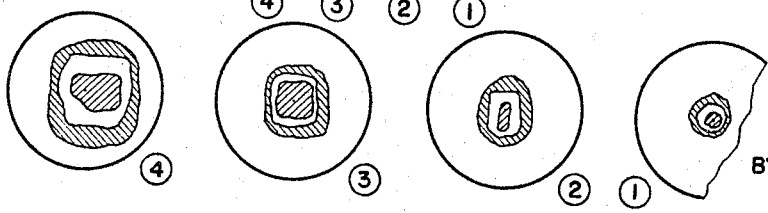
INVENTORS
John R. Wesel
Leonard E. Olds
BY Marn &
Jangarathis
ATTORNEYS

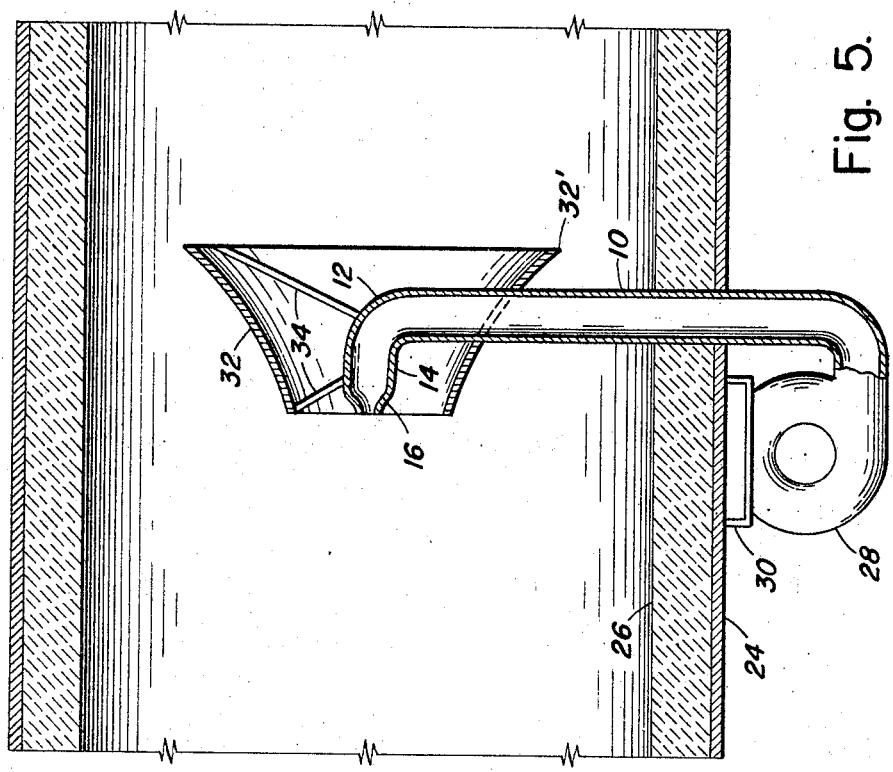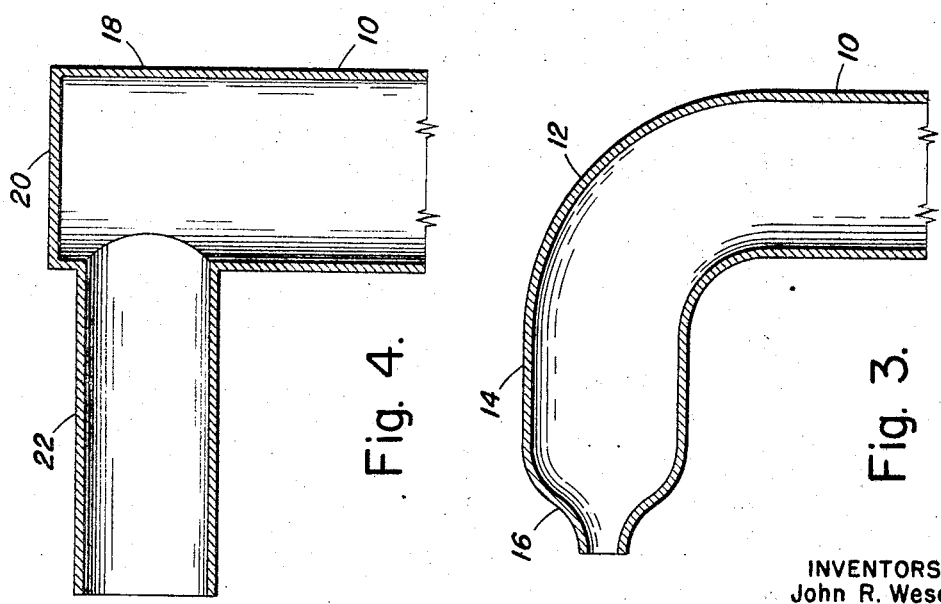

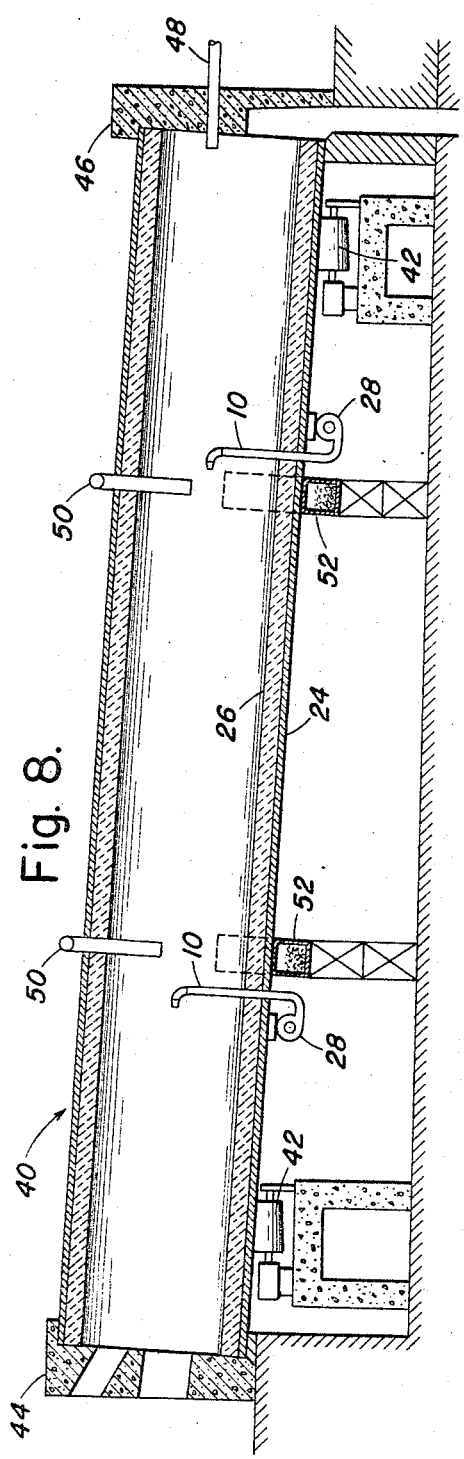
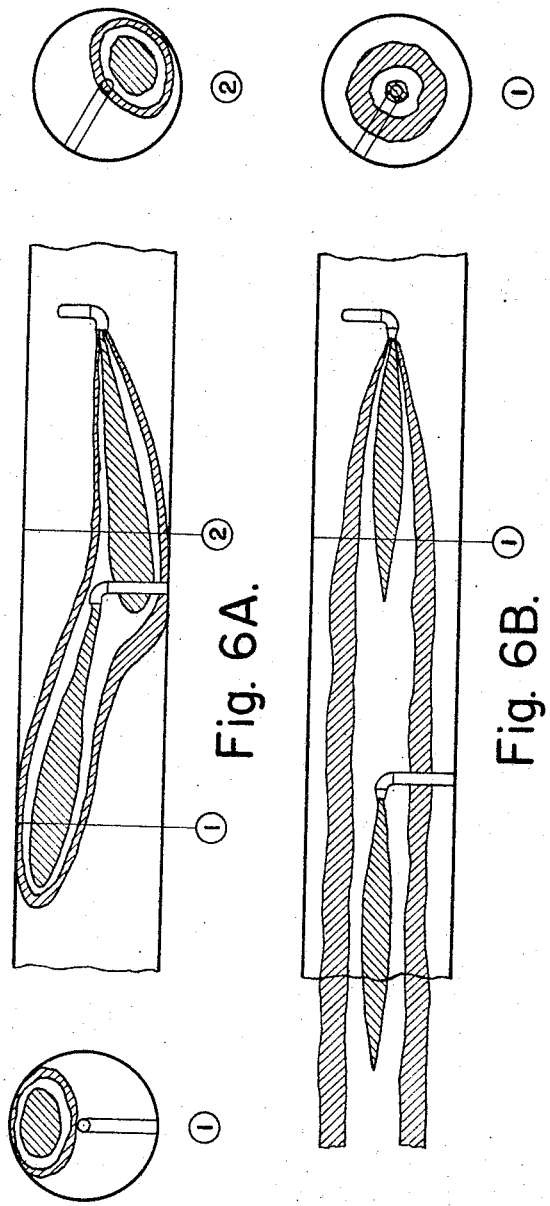

United States Patent Office 3,427,010
Patented Feb. 11, 1969

3,427,010
HEATING APPARATUS AND PROCESS
John R. Wesel, Lewiston, and Leonard E. Olds, Grand Island, N.Y., assignors to Strategic Materials Corporation, Niagara Falls, N.Y., a corporation of New York
Filed Oct. 19, 1965, Ser. No. 497,686
U.S. Cl. 263—33                6 Claims
Int. Cl. F27b 7/36, 7/34

ABSTRACT OF THE DISCLOSURE

In the use of rotary kilns for ore reduction, oxygen-bearing gases are often injected in conjunction with a source of fuel to heat the charge-bed to high temperatures. Impingement of the hot flames on the bed and kiln sidewalls is a continuing problem. In the present invention, specially designed flow-directing nozzles are located exactly on the central axis of the kiln, parallel with the kiln, and pointing toward the flue end of the kiln. These nozzles produce a long, even cone of flame which heats the charge uniformly without impingement. Of particular interest is the operation of the flow-directing nozzles in conjunction with the introduction of coal containing volatile matter through the side of the kiln, which coal is introduced onto the kiln bed separate from, but adjacent to the flow-directing nozzles.

---

This invention relates generally to combustion heating and, more particularly, it relates to the construction and operation of rotating kilns of the type employed to partially reduce a mixture of ore and a carbonaceous reductant. The apparatus and process of the invention are characterized by more even kiln operation and a higher degree of control over kiln temperature and atmosphere than have heretofore been possible.

Control of the atmopshere and temperature along the entire length of a rotating metallurgical kiln have long been recognized as highly desirable. Typically, temperature control has been effected by employing pipes which inject air at a plurality of points along the length of the kiln. This is called "side-air" injection, and results in burning the reducing gases at each point. These conduits or pipes have also been employed to inject reducing gases into the kiln for atmosphere control but, more typically, the atmosphere has been controlled by the introduction of solid, carbonaceous reductant through suitable scoops or feed pipes located at selected points along the length of the kiln. Introduction of reductant in a hot section of the kiln has a further advantage in that many reductants become very sticky before volatile matter is driven off, and fast heating in this section tends to reduce this problem.

Many types of air or gas injection apparatus have been suggested. For example, pipes running to the central axis of the kiln have been connected to a single main or header on the outside of the kiln, which is supplied through a suitable rotatable valve to a stationary main, also on the kiln axis. A simpler device supplies air to each injection conduit by means of a blower mounted on the outside of the kiln. Other suggested means include pipes buried in the kiln sidewalls which blow air or gas onto or through the hot bed.

Several designs of injection pipe have been suggested for side air injection. Most commonly, the pipe terminates in a simple mitred elbow at the kiln axis, the opening being pointed toward the charge end of the kiln (i.e. the direction of air flow). Other workers have suggested that the elbow point toward the discharge end, so that the air is injected countercurrent to the general flow of gases through the kiln. More recently a central fuel pipe with a surrounding, coaxial air pipe has been suggested.

One of the continuing problems with all of the aforementioned designs is that the flame produced by combustion of the reducing gases with injected air impinges on the sidewall of the kiln at a particular point causing a "hot spot." Such hot spots cause sticking and ringing of reductants and fine ores, and materially shorten refractory life. There is little mention of such hot spots in the literature. Moreover, there is an equal lack of information on the cumulative effect of several side-air injection points or the effect of coal injection on side-air injection and vice versa. It is known, however, that most of the heat which reaches the bed is radiant heat from the flame of the burning gases. In other words, the hot spots on the kiln wall, or the heat in the kiln wall generally, do not contribute much to heating the bed.

It is thus a general object of the present invention to provide an improved apparatus for side-air injection and an improved method of kiln operation, including side coal addition, for use in conjunction therewith.

Another object of the present invention is to provide a side-air injection device which eliminates hot spots.

Still another object of the present invention is to provide a side-air injection device which produces a more even kiln temperature and which improves heat transfer to the bed.

Yet another object of the invention is to provide a side-air injection device which produces good temperature control and good heat transfer to the bed with fewer injection points than were heretofore considered necessary.

An additional object of the invention is to provide for the coordinated use of side-air injection and side coal injection, which use results in an improved kiln operation.

A still further object of the invention is to provide a method and apparatus for carrying out reactions in a rotating kiln at or even slightly above the fusion point of the charge without forming rings of fused material on the kiln wall.

Various other objects and advantages of the invention will become clear in the course of the following description of several embodiments thereof, and the novel features will be particularly pointed out in connection with the appended claims. Understanding of the invention will be facilitated by also referring to the accompanying drawings, in which:

FIGURES 1A and 1B are schematic illustrations showing air flow distribution for a conventional mitred-elbow injection pipe at low and high velocities, respectively;

FIGURES 2A and 2B are similar to FIGURES 1A–B, but for an air-injection pipe according to the present invention;

FIGURES 3, 4 and 5 are cross-sectional views of three separate embodiments of flow-directing air injection nozzles according to the invention;

FIGURES 6A and 6B are schematic illustrations, similar to FIGURES 2A–B, but showing the effect of two injection pipes;

FIGURE 8 is a cross-sectional elevation view of a rotating kiln equipped for operation in accordance with the present invention.

Figure 7:
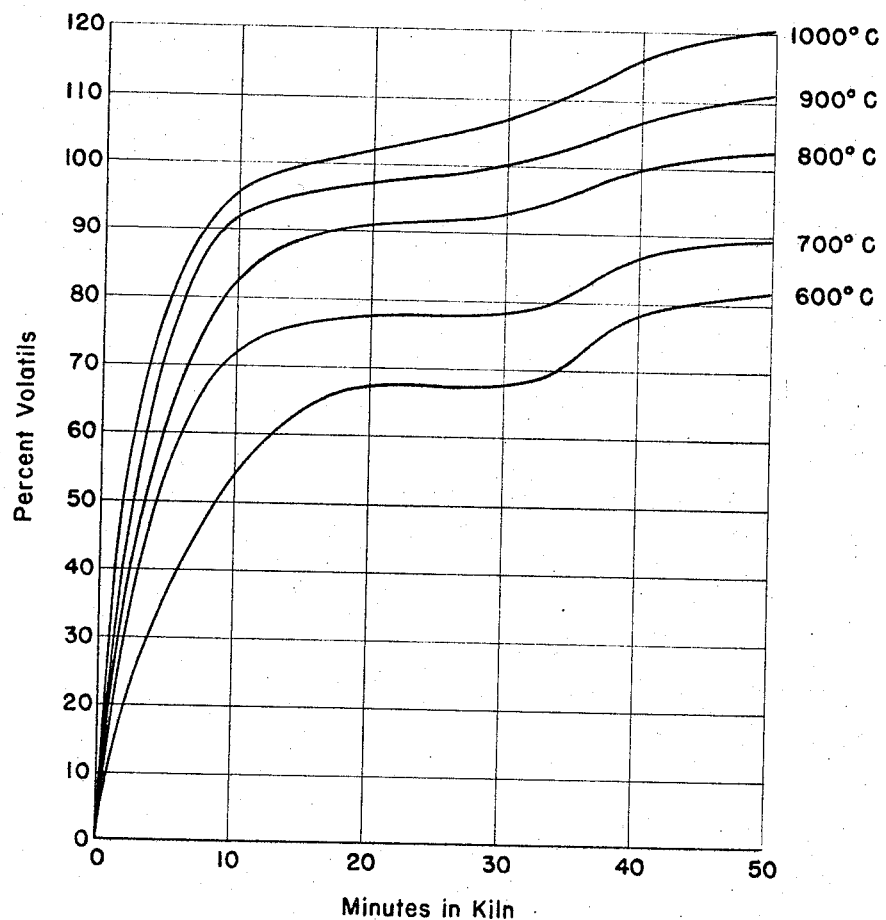
FIGURE 7 is a graph showing the time required to devolatilize a typical coal sample at various temperatures.

Air flow tests illustrated in FIGURES 1A–B, 2A–B and 6A–B were conducted in a 4½ x 80 foot kiln, relative velocities and distribution of air upstream from the injection point being estimated from the deflection of pieces of yarn tied to a piano wire frame which spanned the kiln cross-section. High, medium and low iso-flow zones are indicated in each figure. The air injection pipe was 3 inches in diameter. In all cases, low velocity was 1800 c.f.m. and high velocity was in excess of 4500 c.f.m.

The present invention is based, in part, on the realization that the simple elbow conventionally employed to direct side-air into the general direction of gas flow does not, in fact, overcome the velocity component of the gas flowing normal to the kiln axis as it comes up through the injection point. This is illustrated graphically in FIGURES 1A–B for both low and high injection velocities.

The general upward flow of the air as it issues from the injection pipe is clear from FIGURES 1A–B there being, in fact, essentially no air flowing below the kiln centerline. Impingement of the air (and, of course, the flame when in operation) on the opposing kiln wall is seen to be a function of gas velocity, being much more severe in FIGURE 1B than in 1A. It can also be seen that the spread of the air into a large portion of the upper part of the kiln is immediate and substantial. FIGURES 1A and 1B show, further, that the zone of highest velocity, the central shaded iso-flow area is relatively short and broad while the zones of lesser velocity, the unshaded intermediate area and the shaded outer area, are stretched out and quite thin. If it is assumed that combustible gases are evolving uniformly from a bed of charge material in the kiln, it is clear that the heat release will be concentrated in the zone of highest velocity, since it takes 9–10 volumes of air to completely consume one volume of a hydrocarbon gas. To put it another way, the greater the quantity of air present in a given spatial volume, the greater will be the heat release from combustion in that volume. It is thus clear that, under conditions illustrated in FIGURES 1A and 1B, the burning of gases will be very intense in a confined area, heating of the bed will be irregular, and hot spots at the point of flame impingement on the kiln side wall will be a severe operating problem.

In a first embodiment of the invention, the injection pipe of FIGURE 1 was modified by adding a 3 x 2 inch concentric reducer thereto, and results are shown in FIGURES 2A and 2B. As is clear from these figures, the air distribution is much improved, being in the form of a narrow cone which is approximately concentric with the axis of the kiln. In no case was there observable impingement on the kiln side-wall, although the lowest velocity component came close at the fourth position in the case of low-velocity injection (FIGURE 2A). A comparison of FIGURES 1 and 2 clearly illustrates the magnitude of improvement obtained when air injection is carried out in accordance with the invention. It can also be seen from FIGURES 1 and 2 that the effect of gas velocity is exactly reversed when the invention is employed. Thus, with conventional practice, the highest velocity gave the worst impingement, but with the reducer in place (FIGURE 2) the highest velocity concentrated the air flow in the central portion of the kiln, in a long narrow cone. It is also clear from FIGURES 2A and 2B that the central zone of highest velocity is long and narrow while the zones of lesser velocity are much broader than in FIGURE 1. This means that combustion, and consequent heat release, will be more even along the length of the kiln and that the temperature of the bed will be more closely controllable.

Persons skilled in the art will be able to determine the optimum pipe and nozzle size for a particular installation, keeping in mind that less air than is necessary is used at downstream burners to maintain a reducing atmosphere and an excess of air is often used upstream to completely burn the gases and preheat the charge (as used herein, the terms "upstream" and "downstream" refer to flow of solids through the kiln, rather than the countercurrent flow of gases).

As discussed more fully hereinbelow, the long, narrow flame obtained by injecting air in this manner allows the operator to use fewer injection points and maintain a more even bed temperature.

The simple concentric reducer illustrated in FIGURES 2A–B is only one of several embodiments of the invention which may be successfully employed. FIGURES 3–5 illustrate other designs, without attempting to show how standard fittings may be employed therein. As the prior art elbows did not succeed in directing the flow of gases along the kiln axis, nozzles of the present invention are referred to generically as "flow-directing nozzles." With reference to FIGURE 3, the injection pipe 10 is connected to a suitable elbow 12, a straight extension section 14 and a reducer 16 having an orifice of reduced size. The reducer, while a desirable feature, is not really essential, as shown in the embodiment of FIGURE 4. In this embodiment, the injection pipe 10 is connected to a T-section 18 which is closed off at 20 to provide an air cushion for the air passing through. An extended straight section 22 gives the air the needed horizontal velocity for satisfactory, centralized distribution. For a 3-inch injection pipe, for example, section 22 should be at least about 6 inches long.

In FIGURE 5 there is illustrated a kiln cross-section with an air injection pipe similar to FIGURE 3, but modified for even more efficient operation. The kiln itself has a steel shell 24 and refractory lining 26. Injection pipe 10 is connected externally to a suitable blower, indicated generally at 28 which is mounted a few inches away from shell 24 on mounting 30 so as to minimize heat transfer. The nozzle construction, comprising sections 12, 14 and 16, is substantially as described in connection with FIGURE 3. A concentric, Venturi-effect baffle 32 is provided in this embodiment to funnel gases passing upstream through the kiln to the vicinity of the air injection point. Baffle 32 is welded to pipe 10 and otherwise supported by suitable struts 34. In the design of baffle 32, it is important to employ a suitably refractory material which can withstand the operating temperature (sometimes in excess of 1000° C.) and which will not corrode in the prevailing atmosphere. Many alloys now available meet these requirements. Also, edge 32' should be high enough so as not to touch the bed. In operation, baffle 32 funnels combustible gases to the nozzle area, a Venturi effect created by the high-velocity gas issuing from the injection pipe helping in this regard. This results in a generally brighter, longer flame, centrally located as illustrated in FIGURE 2.

FIGURES 6A and 6B illustrate how the flow-directing nozzles of the present invention improve air flow and combustion when used at a number of points along the length of a kiln. FIGURE 6A shows two conventional nozzles located 6–8 feet apart and the air flow pattern from each at high injection velocity. As can be seen, the patterns are essentially the same as for the single nozzle of FIGURE 1B, i.e. the flow of air from a downstream nozzle has no real effect on the pattern of air flow from a nozzle further upstream. As in FIGURE 1B, there is substantial flame impingement on the kiln side-wall and combustion is concentrated in the short, broad zone of highest velocity.

With flow-directing nozzles in place, as shown in FIGURE 6B, an entirely different situation prevails. The highest velocity zone from each nozzle is very thin, and the medium and low velocity zones are very broad and centrally located. More importantly, these lower velocity zones form a continuous air flow pattern from one nozzle to the next, providing an extremely even heat release over an extended length of the kiln, and thus insuring a very easily controlled bed temperature. It will be noted, further, that the nozzles in FIGURE 6B are much farther apart that those in FIGURE 6A. In fact, it has been determined that with flow-directing nozzles, the air inlets may be two or two and a half times farther apart than would be required without the nozzles. For example, in the 4½ x 80 foot kiln noted above, seven air inlets were originally installed 6–8 feet apart. With flow-directing nozzles, three inlets 20 feet apart provided the much improved air flow pattern of FIGURE 6B throughout essentially the entire kiln length.

The combustible gases burned at air injection points consist largely of volatile matter released from high-volatile coal introduced at a downstream injection point or points. It has apparently been assumed by prior workers that this volatile matter is driven off gradually from the coal as it proceeds downstream from the injection point. That this is clearly not so is seen from FIGURE 7, wherein the time necessary for volatile evolution for a typical coal sample is plotted for several different temperatures. Coal used in this test has 34.24% volatile matter and 55.74% fixed carbon. It can be seen that even at a temperature as low as 600° C. more than 50% of the volatile matter was released in 10 minutes. At 900° to 1000° C., more than 90% was driven off in 10 minutes. The second aspect of the present invention derives from this discovery that volatile matter is driven off very rapidly when injected through side coal feeders in a rotating kiln. In essence, this aspect comprises placing the coal feeders adjacent an air injection point, whereby the volatile matter quickly released is immediately burned, before it can be diluted with other non-combustible gases. It has been determined that this juxtaposition of side-coal feeder and side-air injection provides the maximum flame possible, and spreads it out over the bed. Since it is well known that 60–70% of heat transfer to the bed is by radiation, the extent of this improvement is manifest. This feature, coupled with the novel nozzle designs for air injection which produce a long cone of flame without impingement on the kiln sidewalls, creates a better overall kiln operation which features more even, higher temperatures, no ringing or sticking and faster reduction of the ore. Whether the coal feeders are placed just upstream or just downstream from the air inlet is a matter of choice. Thus, if it is desired to inject powdered, low-volatile coal, the coal feeder will be preferably placed just upstream from the inlet so that the coal falls through the air stream issuing from the nozzle, which picks the particles up and carries them along. The small particles incandesce quickly. High volatile or lump coal, on the other hand, will generally be fed just downstream from the air inlet.

A kiln installation equipped for carrying out the invention is shown in FIGURE 8, which is a simplified, cross-sectional view of a typical metallurgical kiln. The kiln, indicated generally at 40, has steel shell 24, lining 26, blowers 28 and injection pipes 10 as noted in connection with FIGURE 5. The kiln is supported on and driven by motor driven trunnions 42, and is provided with an end-wall 44 at the charge end containing openings for charging ore and removing gases, and an end-wall 46 at the discharge end which has a discharge opening and a gas or oil fired burner 48. These features are all conventional in kilns of this type.

Just adjacent air-injection pipes 10 are a pair of coal feeding scoops 50 which pick up coal from troughs 52 located underneath the bottom portion of the kiln. Hoppers (not shown) keep each trough supplied with coal. While only one scoop is shown at each location, it will be understood that more than one may be employed, and it will be further understood that other known means of feeding coal may be used; the location thereof adjacent the side-air pipes is the important feature. As shown, one feeder is downstream and one feeder is upstream from an air inlet.

In this kiln, the one-third nearest the charge end is devoted mainly to heating and drying the ore, calcining any limestone mixed therewith, and driving off sulfur and other volatiles. The two-thirds near the discharge end are devoted to reducing the ore. Coal is added at the upstream coal feeder and volatiles are driven off in the same vicinity, these being burned in the upstream burner. In accordance with the invention, the flame produced therein burns in a long, narrow, centrally-located cone almost up to the charge end.

The second side-air injection pipe burns in a similar fashion over the middle third of the kiln, the downstream coal feeder just behind it supplying the necessary fuel. The one-third of the kiln nearest the discharge end is heated, as required, by gas or oil fired burner 48 in end-wall 46. In this manner, a hot, radiant flame is provided over almost the entire length of the kiln, but troublesome hot spots, and consequent sticking and ringing, are avoided. The flame produced (of the general outline shown in FIGURE 6B) heats the bed in a uniform manner, so that it is possible to bring the bed to the fusion point without fear of having it stick or hang-up on the kiln walls. Since reduction proceeds at a very high rate at this temperature it is possible to achieve a greater degree of reduction than has heretofore been possible without serious sticking problems.

It will be understood that various changes in the details, materials, steps and arrangements of parts, which have been set forth herein in order to describe and illustrate the invention, may be made by those skilled in the art within the principle and scope of the invention as defined in the appended claims.

What is claimed is:

1. Injection means for supplying gas to a rotary kiln comprising:
   gas-supply means exterior of said kiln;
   conduit means connected to said gas supply means and passing through the shell of said kiln into the interior thereof; and
   flow-directing nozzle means on the inner end of said conduit means, said nozzle being located on the central axis of said kiln, the opening thereof pointing in the direction of gas flow through said kiln and being designed so as to direct said gas along the axis of said kiln, said nozzle means comprising an elbow section and a concentric reducer section having an orifice, said orifice being of smaller diameter than said conduit.

2. A rotary kiln comprising:
   a tubular shell with a refractory inner lining;
   drive means for rotating said kiln at an angle slightly declined from the horizontal;
   first end-closure means at the upper, charge end of said kiln and including charge means and gas withdrawal means;
   second end-closure means at the lower, discharge end of said kiln and including discharge means;
   a plurality of side-air injection pipes located along the length of said kiln, each said pipe being connected to air supply means on the exterior of said kiln and terminating in a flow-directing nozzle located on the central axis of said kiln, each said nozzle pointing along said axis in the direction of gas flow through said kiln and being designed so as to direct said gas along the axis of said kiln, each said flow-directing nozzle comprising an elbow section and a concentric reducer section having an orifice of reduced size; and
   coal supply means adjacent to at least one of said side-air injection pipes.

3. In the operation of a rotary kiln for the reduction of a metallurgical charge at an elevated temperature and including the use of side-air and side-coal, the improvements comprising:
   supplying said side air from a flow-directing nozzle having an elbow section and a concentric reducer section having an orifice of reduced size along the central axis of said kiln and in the direction of flow of gases passing through said kiln, said air being supplied at a sufficient velocity to avoid, on combustion with said gases, impingement of flame on the wall of said kiln; and
   injecting side-coal at a point adjacent to the point of injection of said side-air, whereby volatile matter driven off of said coal is efficiently burned with said side-air.

4. A method for uniformly heating a rotating kiln comprising:
   injecting air at a plurality of points along the central axis of said kiln in the direction of flow of gases through said kiln, said air being injected through flow directing nozzles having an elbow section and a concentric reducer section at a sufficient velocity so as to be capable of burning said gases in the central portion of said kiln without impingement on the sidewalls; and injecting coal at a plurality of points adjacent to said points of air injection, whereby volatile matter driven off of said coal is efficiently burned with said air.

5. In the heating of a charge in a rotating kiln by combustion of a hydrocarbon gas with air injected at a plurality of points along the length of said kiln, the improvements comprising injecting said air through flow directing nozzles having an elbow section and a concentric reducer section along the control axis of said kiln at a sufficient velocity and in the axial direction so as to avoid impingement on the side walls thereof, whereby heat released to said charge by said combustion is substantially uniform in the zone of said combustion.

6. Process for the partial reduction of a metallurgical burden in an inclined rotating kiln comprising:

charging said burden at the upper, charge end and discharging the reduced burden at the lower, discharge end;

heating said burden with added reductant to a temperature near the fusion point thereof by the combustion of a hydrocarbon gas with air over said burden, said heating comprising:

injecting air along the central axis of said kiln at a plurality of points along the length thereof through flow directing nozzles having an elbow section and a concentric reducer section, said air flowing toward the charge end of said kiln in the central portion thereof and substantially out of contact with the walls of said kiln;

charging a carbonaceous reductant containing volatile hydrocarbons onto said burden at a plurality of points adjacent at least some of said points of air injection, said hydrocarbons being volatilized and burning with said air; and reducing said burden by reaction of said reductant with said burden at said temperature.

References Cited

UNITED STATES PATENTS

| | | | |
|---|---|---|---|
| 1,379,083 | 5/1921 | Clevenger | 263—34 |
| 2,941,791 | 6/1960 | Wienert | 263—33 |
| 2,965,366 | 12/1960 | O'Mara et al. | 263—32 |
| 3,206,299 | 9/1965 | Senior et al. | 263—33 X |
| 3,235,375 | 2/1966 | Meyer et al. | 263—33 X |

FREDERICK L. MATTESON JR., *Primary Examiner.*

EDWARD G. FAVORS, *Assistant Examiner.*